Nov. 3, 1931.  E. B. ROSE  1,829,812
MIXER
Original Filed Sept. 11, 1929
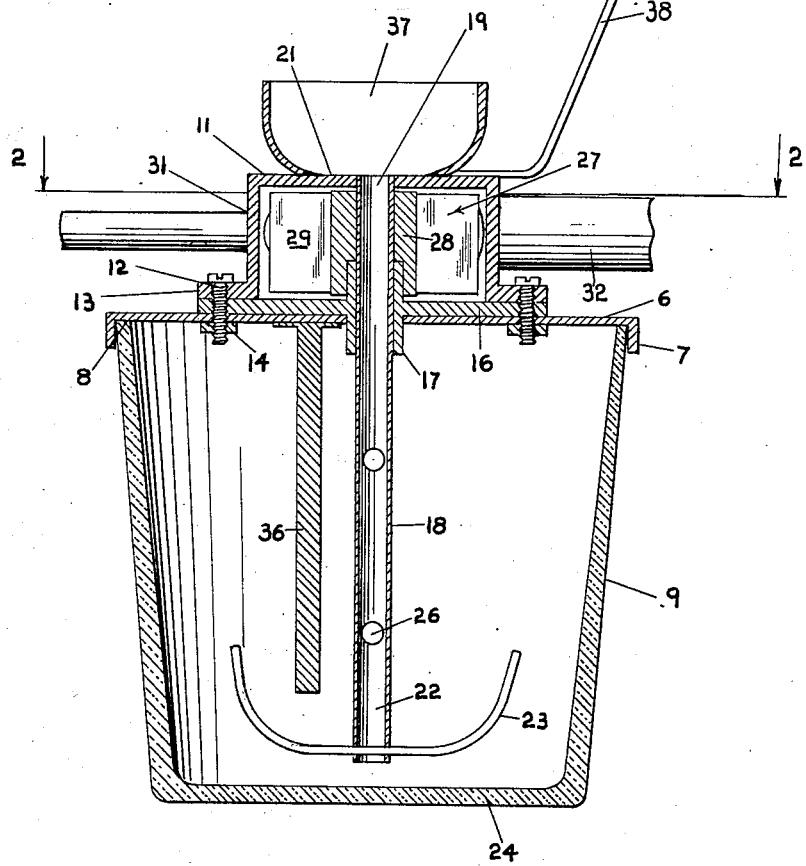
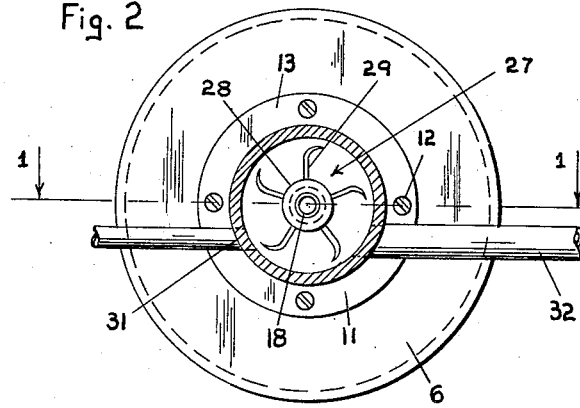
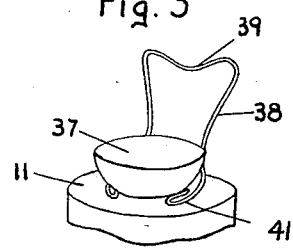
Inventor
Elias B. Rose
by Hazard and Miller
Attorneys Patented Nov. 3, 1931

1,829,812

UNITED STATES PATENT OFFICE

ELIAS B. ROSE, OF OAKLAND, CALIFORNIA

MIXER

Application filed September 11, 1929, Serial No. 391,849. Renewed March 20, 1931.

This invention relates to mixing devices, and has for an object the provision of an improved type of mixing device of the type conventionally employed for such operations as mixing mayonnaise, or batters of various kinds, for whipping cream, or beating eggs.

A further object is the provision of a mixing device as described, which is adapted to be energized by a small turbine, with the result that the device is of particular utility as a kitchen utensil, inasmuch as it may receive its power from the ordinary city water supply or other pressure system.

Another object is the provision of a mixer as described, which is provided with means for introducing materials to the receptacle in which the materials are to be mixed during operation of the mixing device. This object, which renders the device particularly advantageous when employed for mixing mayonnaise, is attained by employing a hollow shaft for the rotary element of the mixer, so that the materials may be poured into the receptacle through the shaft.

A still further object is the provision of means for breaking up the ball of material which would otherwise be apt to collect upon the rotary element when such commodities as bread or cake dough are being mixed.

An additional object is the provision of a removable bracket for supporting a supply receptacle in position to discharge into the tubular shaft, thus making it possible to support a can of oil or other supply receptacle in that position in which its contents will slowly run therefrom into the shaft, and thence into the receptacle in which the materials are being mixed. In this manner it is made possible to carry out the rather lengthy process of making mayonnaise without the necessity of constant attention on the part of the operator.

The invention possesses other objects and advantageous features, some of which, with those enumerated, will be set forth in the following description of the invention's particular embodiment which is illustrated in the drawings accompanying and forming a part of the specification.

Referring to the drawings:

Figure 1 is a vertical, medial, sectional view of a mixer incorporating the principles of the present invention. The plane of section is indicated by the line 1—1 of Fig. 2.

Fig. 2 is a horizontal sectional view taken upon the line 2—2 of Fig. 1.

Fig. 3 is a perspective view on a smaller scale, showing the supporting bracket and its method of attachment to the mixer.

In its preferred embodiment, the mixer of the present invention is supported upon a plate 6. Preferably the plate 6 is provided with a depending annular flange 7 at the periphery thereof, adapted to engage and extend downwards past the top edge 8 of a suitable mixing receptacle 9.

A turbine housing 11 is secured to the top of the plate 6 in any convenient manner such as by a plurality of machine screws 12 extending through a flange 13 with which the bottom of the housing 11 is provided, and through the plate 6 to receive nuts 14. A smaller plate 16 is interposed between the bottom of the housing 11 and the plate 6; and a relatively elongated bearing structure 17 is formed preferably integral with the plate 16, the axis of this bearing being perpendicular to the plates 6 and 16.

A tubular shaft 18 is journalled within the bearing 17 and extends completely through the housing 11 so that the upper end 19 of the tubular shaft 18 opens to the atmosphere above the top 21 of the housing 11, whereas the lower end 22 of the shaft 18 extends downward from the plate 6 such a distance that an agitator 23 preferably in the form of one or more suitably bent wires carried thereby, is disposed slightly above the bottom 24 of the receptacle 9. Preferably the agitators 23 are of such dimensions or are secured to the lower end 22 of the shaft 18 in such a manner that they do not seal the lower end of the shaft 18, thus establishing communication with the outside of the receptacle 9 through the bore of the tube. Furthermore, a plurality of apertures 26 may be formed in the walls of the tube 18 at various points below the plate 6.

A rotor 27 consisting of a hub 28 and a plurality of radiating vanes 29, is rigidly secured to the shaft 18 inside the housing 11; and a nozzle 31 leads into the housing 11 in such a position that it is adapted to direct its jet against the blades 29 substantially tangentially to the path described thereby when the rotor 27 turns; and a discharge tube 32 is provided whereby fluid may be conducted from the housing 11 after it has impinged upon the blades 29. Thus it may be readily understood that by connecting the nozzle 31 to a suitable source of fluid under pressure, such as a faucet of a city water supply system, water under pressure may be discharged through the nozzle 31 and into the housing 11 to effect rotation of the shaft 18 and agitators 23, the speed of rotation being proportional to the force of the fluid ejected from the nozzle 31.

A baffle 36 is rigidly secured to the under side of the plate 6 in position to extend downwards parallel to the shaft 18, and is of such length that its lower end is disposed adjacent the agitators 23. The purpose of this baffle 36 is to reduce the tendency of liquids to swirl about inside the receptacle 9 without effecting any mixing thereof, and also to break up the ball of material that is apt to develop when such commodities as dough are being mixed.

Means are provided for introducing materials preferably liquid into the receptacle 9 during operation of the mixer. A funnel 37 is provided upon the top 11 of the housing, being secured thereto in any convenient manner such as by welding or soldering. This funnel 37 opens upward and is adapted to discharge into the bore of the shaft 18, so that any materials poured into the funnel 37 will find their way by gravitation through the shaft 18 into the receptacle 9. Furthermore, I have provided a removable bracket 38 in the form of a bent wire clip defining a notch 39 adapted to receive a corner of a conventional oil-receiving receptacle while the top of that receptacle rests against the far side of the funnel 37. In this manner this supply receptacle may feed slowly into the funnel 37, the rate of feed being proportional to the size of an aperture formed in the top thereof through which the oil or other material may flow. This makes it possible to carry out the process of mixing mayonnaise without the necessity of constant attention on the part of the operator after the initial ingredients have been prepared. The ends 41 of the bracket 38 may be spread apart owing to the inherent resiliency of the wire of which the bracket 38 is constructed, so as to permit the bracket 38 to be removed from or inserted upon the funnel 37.

It is to be understood that the details of the invention as herein disclosed, are subject to alteration within the spirit or scope of the appended claim.

I claim:

A mixing device comprising a housing, means for supporting said housing upon a receptacle, a shaft journalled in said housing and extending downward therefrom, an agitator carried by said shaft, means for rotating said shaft, means for introducing materials to said receptacle while said mixing device is disposed thereupon, and a supporting bracket associated with said introducing means and adapted to support a container thereabove.

In testimony whereof I have signed my name to this specification.

ELIAS B. ROSE.